United States Patent [19]
Goritz et al.

[11] Patent Number: 5,328,253
[45] Date of Patent: Jul. 12, 1994

[54] ELECTROPNEUMATIC CONTROL SYSTEM FOR COMPRESSED AIR BRAKES OF RAIL CARS

[75] Inventors: Bernd Goritz; Erich Huber, both of Munich, Fed. Rep. of Germany

[73] Assignee: Knorr-Bremse AG, Munich, Fed. Rep. of Germany

[21] Appl. No.: 127,115

[22] Filed: Sep. 27, 1993

Related U.S. Application Data

[63] Continuation of Ser. No. 822,875, Jan. 21, 1992, abandoned.

[30] Foreign Application Priority Data

Jan. 21, 1991 [DE] Fed. Rep. of Germany ....... 4101613

[51] Int. Cl.[5] .............................................. B60T 13/68
[52] U.S. Cl. ......................................... 303/36; 303/39
[58] Field of Search .............................. 303/3, 15–16, 303/27, 33, 36, 38, 39, 69, 118

[56] References Cited

U.S. PATENT DOCUMENTS

| | | | |
|---|---|---|---|
| 4,021,079 | 5/1977 | Bohusch | 303/15 X |
| 4,026,609 | 5/1977 | Bridigum | 303/57 X |
| 4,576,416 | 3/1986 | Müller et al. | 303/15 |
| 5,100,208 | 3/1992 | Angermair | 303/36 |

FOREIGN PATENT DOCUMENTS

| | | | |
|---|---|---|---|
| 1165645 | 1/1963 | Fed. Rep. of Germany | |
| 2164111 | 3/1986 | United Kingdom | 303/33 |

*Primary Examiner*—Robert J. Oberleitner
*Assistant Examiner*—Josie A. Ballato
*Attorney, Agent, or Firm*—Pollock, Vande Sande & Priddy

[57] ABSTRACT

The electropneumatic control system for the pressure in the main air pipe (37) of compressed air brakes of rail cars is provided with one inlet and one outlet solenoid valve (3 and 4) to control the pressure in a control chamber (26) of a relay valve (19). The inlet solenoid valve (3) and the relay valve (19) are supplied with compressed air from a main reservoir pipe (34). The relay valve controlled by the pressure in the control chamber (26) against the pressure in the main air pipe (37) controls the compressed air lead-in and lead-out for the main air pipe (37). To avoid the undesired response of the relay valve (19) to pressure changes elsewhere in the main air pipe (37), the two sides of the piston (20) of the relay valve (19) are closed without any throttling by way of the secondary valve parts (13 or 14) of the two solenoid valves (3 and 4) in the unactuated state of the control system (2).

7 Claims, 1 Drawing Sheet

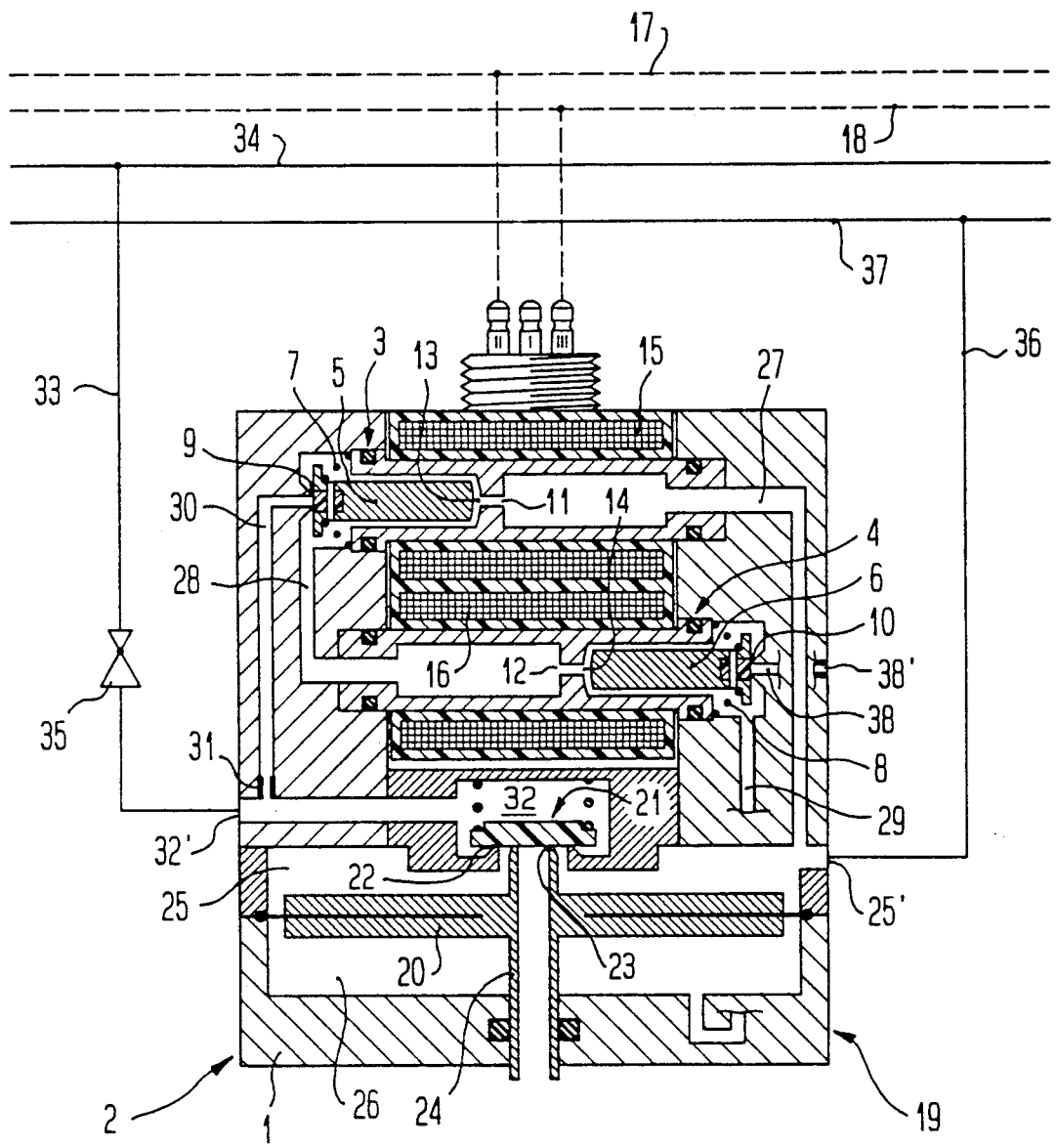

ELECTROPNEUMATIC CONTROL SYSTEM FOR COMPRESSED AIR BRAKES OF RAIL CARS

This application is a continuation of application Ser. No. 07/822,875 filed Jan. 21, 1992, now abandoned.

FIELD OF THE INVENTION

The invention relates to an electropneumatic control system for the pressure in the main air pipe of compressed air brakes of rail cars, with one inlet and one outlet solenoid valve, whose tight shutoff valve parts are arranged in pneumatic connections from a main reservoir pipe to a control chamber or from the control chamber to atmosphere. The control chamber is attached to a main air pipe by means of a connection comprising a passage monitoring element, and with a relay valve comprising a piston pressurized by the pressure in the control chamber against the pressure in the main air pipe, in order to actuate a two-way valve including inlet and outlet valve parts. The inlet valve part, which opens in the control chamber only under prevalent pressure, is arranged in a connection from the main reservoir pipe to the main air pipe, while the outlet valve part, which opens in the main air pipe only under prevalent pressure, is arranged in a connection from the main air pipe to atmosphere.

BACKGROUND OF THE INVENTION

Such a control system is known from DE-PS 1 165 645. The inlet and the outlet solenoid valve are designed as simple, separate solenoid valves, each of which is followed by a restrictor as the releasing or braking nozzle. The relay valve designed separately from these solenoid valves is supplied with compressed air from the main reservoir pipe via a non-return valve, the volume of the control chamber pressurizing the piston is enlarged by a separate air reservoir, and a throttle is arranged as a passage monitoring element in a connection from the main air pipe to this air reservoir. The result of the constantly opened, throttled connection between the main air pipe and the control chamber is that, while controlling the pressure in the control chamber by means of the solenoid valves, the control chamber pressure can be falsified by the air inflow or outflow from or to the main air pipe, so that accurate position control of the desired control chamber pressure, and thus, via the relay valve of the main air pipe pressure, cannot be assured.

Another special feature of this known control device is that, when emergency braking is initiated, with a correspondingly rapid pressure drop in the main air pipe due to the throttled connection in the control chamber, the pressure drop is merely delayed; thus, the relay valve responds in the direction to refeed the main air pipe pressure from the main reservoir pipe, and emergency braking is delayed or even cancelled. The same applies when filling strokes are introduced into the main air pipe, during which the relay valve of the known control system would respond and would bring about undesired venting of the main air pipe.

To eliminate these deficiencies, it could be obvious to bridge the restrictor in the connection from the main air pipe to the control chamber of means of a solenoid valve, which is open in the quiescent state of the control system and is closed only when the inlet or outlet solenoid valve is actuated. As a result, in the quiescent state of the control system the connection between the control chamber and the main air pipe would not be throttled, thus obviating an undesired response of the relay valve during emergency braking or filling strokes. However, owing to the additional solenoid valve the cost of construction and in particular the energy consumption of the control system is significantly increased. For long trains with a plurality of such electropneumatic control systems this would require an acceptably large amount of current fed into the electric control lines, and thus would not be usable precisely in those train formations in which such control systems would be especially necessary and advantageous.

As a consequence of the separate arrangement of the individual elements, the known control system requires a great deal of time to build and assemble.

SUMMARY OF THE INVENTION

The object of the invention is to design an electropneumatic control system of the aforementioned kind in such a manner that it does not act against the pressure operations in the main air pipe during emergency braking and filling strokes, without increase in current consumption and without increased manufacturing and assembly costs.

The problem is solved by the invention in that both the inlet and the outlet solenoid valve are designed as a 3/2-way valve with a secondary valve part counterconnecting to the respective tight shutoff valve part and is effective at least as a restrictor in the closed state, the two secondary valve parts being connected in series between the control chamber and the main air pipe.

It must be emphasized that, to make the solenoid valves less expensive, their secondary valve parts can be designed metallically sealingly, and that, to reduce the installation costs of the control system in a compressed air brake system of rail cars, the inlet and outlet solenoid valve, the relay valve and the control chamber can be combined into one subassembly, which has only two pneumatic connections, namely, one to the main air pipe and one to the main reservoir pipe. The subassembly thus formed is also quite suitable to serve as a component of a brake control valve.

BRIEF DESCRIPTION OF THE DRAWING

The drawing is a sectional view of an advantageous embodiment of an electropneumatic control system according to the invention.

DETAILED DESCRIPTION

A housing 1 of the electropneumatic control system 2 that can be designed optionally of multiple parts has two solenoid valves arranged side by side and with parallel axes, one being an inlet solenoid valve 3 and the other being an outlet solenoid valve 4. Each of the two solenoid valves 3, 4, has an armature 5 or 6 movable in the housing 1, the end of such armature being located in the direction of a spring load 7 or 8 bearing a valve seal of elastic material and forming with a stationary valve seat in the housing a shutoff valve part 9 or 10. The other armature end is rounded off and forms, together with an annular flange enclosing channel lead-ins 11 or 12, acting as passage monitoring elements, on the end of the chamber receiving axially displaceably to a limited degree the armature 5 or 6, a secondary valve part 13 or 14 that seals only metallically and thus is not pneumatically sealed. Thus, the two solenoid valves 3 or 4 are 3/2 way solenoid valves with one sealed and one leaky valve part. Armatures 5 and 6 are movable as a function of the excitation of the magnetic coils 15 or 16, the magnetic coil 15 associated with the inlet solenoid valve 3 being connected electrically to a release cable 17, and the magnetic coil 16 associated with the outlet solenoid valve 4 being attached electrically to a brake cable 18. The two cables 17 and 18 can be coupled together by a train formation and are supplied with power by means of a switching device (not illustrated) depending on the desired braking or releasing operations.

Offset laterally relative to the inlet solenoid valve 3 and outlet solenoid valve 4, a relay valve 19 is arranged in the housing 1 and has an axial direction perpendicular to those of the solenoid valves. Relay valve 19 has a piston 20 actuating a two-way valve 21 with an inlet valve part 22 and an outlet valve part 23. Piston 20 is traversed by a valve pipe 24, which terminates in a valve seat belonging to the outlet valve part 23 and projects sealingly displaceably beyond the housing 1 into open space; of course, the open end can be covered by an air filter and/or muffler. Piston 20 separates a main air pipe chamber 25 adjacent to the two-way valve 21 from a control chamber 26. The main air pipe chamber 25 is connected by an air guide channel 27 in housing 1 to the channel lead-in 11 of the inlet solenoid valve part 3. The chamber accommodating the armature 5 of the inlet solenoid valve 3 is connected by another air guide channel 28 to the channel lead-in 12 of the outlet solenoid valve, and the chamber accommodating the armature 6 of this outlet solenoid valve 4 is connected by yet another air guide channel 29 to the control chamber 26. The two secondary valve parts 13 and 14 are thus arranged in series in a pneumatic connection from the main air pipe chamber 25 to the control chamber 26.

The valve seat of the shutoff valve part 9 that is fixed stationarily in the housing surrounds the mouth of an air guide channel 30, which is attached to another air guide channel via a restrictor 31 serving as the release nozzle. The latter air guide channel opens into a chamber 32 accommodating a double sealing plate of the two-way valve 21, and into a pipe connection 32' to be attached to a main reservoir pipe 34 via a pipe line 33. A pressure reducing valve 35 is disposed in the pipe line 33. The main air pipe chamber 25 communicates with a pipe connection 25' from which a pipe line 36 leads to a main air pipe 37.

The stationary valve seat of the shutoff valve part 10 encloses an air guide channel 38 which opens to atmosphere via a brake nozzle 38' optionally covered in the usual manner by an air filter and/or muffler.

The main reservoir pipe 34 and the main air pipe 37 are part of the compressed air brake (not shown in detail); they extend throughout the rail vehicle comprising the electropneumatic control system 2, and are coupled through the entire train formation upon installation thereinto of the rail vehicle. The main reservoir pipe 34 is to be attached to the compressed air source of relatively high pressure, and the main air pipe 37 is to be attached to an engineman's brake valve.

In the quiescent state of the electropneumatic control system 2, when the compressed air brake is released and ready for operation, the individual parts of the control system assume the positions shown in the drawing. When the magnetic coils 15 and 16 are not excited, the shutoff valve parts 9 and 10 are closed under spring loads 7 and 8, while the counterconnecting secondary valve parts 13 and 14 are open. The regulating pressure head of, for example, 5 bar corresponding to the released brakes and prevailing in the main air pipe 37 prevails, due to the connection via duct 36, also in the main air pipe chamber 25, and, due to the unthrottled connection via air guide channels 27, 28 and 29 and the secondary valve parts 13 and 14 disposed between those air guide channels, also in the control chamber 26. A pressure head which at least corresponds to this regulating pressure head and is defined by the pressure reducing valve 35, from the main reservoir pipe 34, conveying a higher pressure, exists in chamber 32 and in the air guide channel 30. The two valve parts of the two-way valve 21 are closed because both sides of the piston are pressurized by compressed air to the same degree.

When pressure in the main air pipe 37 changes, for example, by the opening of an emergency brake valve or by the introduction of a filling stroke, similar pressure changes occur both in the main air pipe chamber 25 and, via its aforementioned, unthrottled connection to the control chamber 26, simultaneously also in the latter, so that piston 20 remains at rest and the two valve parts of the two-way valve 21 remain closed. Thus, the electropneumatic control device 2, and in particular its relay valve 19, is unaffected by the pressure changes in the main air pipe 37; in particular, they do not act against these pressure changes.

For electropneumatic braking, the magnetic coil 16 must be excited via brake cable 18, whereby the armature 6 is displaced to its end position (opposite to the one shown) against the spring load 8, while opening the shutoff valve part 10 and closing the secondary valve part 14. Opening the shutoff valve part 10 causes the control chamber 26 to be vented via the air guide channels 29 and 38, whereby the pressure gradient in the control chamber 26 is defined by the brake nozzle 38'. Closing the secondary valve part 14 blocks or at least throttles significantly the pneumatic connection from the main air pipe chamber 25 to the control chamber 26, so that the venting operation for the latter cannot be changed by the subsequent air flowing from the main air pipe chamber 26 or the main air pipe 37. Piston 20 is subjected to and moves under the pressure differential in the direction of the control chamber 26, causing the outlet valve part 23 to open for the removal of air and lowering of the pressure downstream of the control chamber 26 in the main air pipe chamber 25 and thus also the main air pipe 37.

The pressure drops in the control chamber and main air pipe chamber 26 and 25 are identical, so that the gradient of the pressure drop in the main air line 37 is also defined by the brake nozzle 38'. Upon reaching the desired brake step, the excitation of the magnetic coil 16 is interrupted so that the armature 6 returns into the position shown. Thus, venting of the control chamber 26 is interrupted and the unthrottled connection between the main air pipe chamber 25 and the control chamber 26 that is reopened by opening the secondary valve part 14 brings about a rapid equalization of pressure between the two chambers, whereupon piston 20 returns into the position shown while the outlet valve part 23 is closed. Thus, the position control of the desired brake step is completed.

For the subsequent, electropneumatic release, the magnetic coil 15 must be excited via release cable 17, so that, analogously to the above operations, the shutoff valve part 9 is opened by displacing armature 5 and the secondary valve part 13 is closed. Monitored by the pressure reducing valve 35 and the restrictor 31 serving as the release nozzle, compressed air flows through the air guide channel 30, the shutoff valve part 9, the air guide channel 28, the opened secondary valve part 14 and the air guide channel 29 into the control chamber 26, the pressure gradient being defined by the restrictor 31. The closed secondary valve part 13 prevents this pressure increase in the control chamber 26 from being affected by the flow process to the main air pipe chamber 25.

The pressure differential occurring at piston 20 lifts the piston in order to open the inlet valve part 22, such that compressed air can flow from chamber 32 into the main air pipe chamber 25 and thus the main air pipe 37, such that in both an identical increase in pressure occurs in the direction of the control chamber 26. As soon as the desired release step is reached, the excitation of the magnetic coil 15 must be ended and the inlet solenoid valve 3 returns under its spring load 7 into the switch position shown. The compressed air feed into the control chamber 26 is interrupted and the unthrottled pressure is rapidly balanced between control chamber 26 and the main air pipe chamber 25, causing piston 20 to return to the position shown while closing the inlet valve part 22. Thus, the desired release step is completed.

Of course, it is possible to have several braking and release operations occur side by side and also in mixed sequence.

It must be emphasized that, during the pressure control operations for the control chamber 26, the latter is virtually closed off from the main air pipe chamber 25 and thus the main air pipe 37; therefore, the pressure control operations for the control chamber 26 are entirely unaffected by the length and the volume of the main air pipe 37. Thus, the volume of the control chamber 26 can be relatively small, so that it can be totally integrated into the housing 1, for example, as shown, as the pressurizing chamber for piston 20; thus, no separate air reservoir is required. The passage cross sections of solenoid valves 3 and 4 can then be correspondingly small, with low energy consumption. Simultaneously, the relay valve 19 assures that the precisely and accurately controllable pressure change operations can be transferred from the control chamber 26 also precisely and accurately to the main air pipe 37, and in particular irrespective of its length and volume.

Furthermore, it must be emphasized that during the control operations only one pilot solenoid valve must be excited; thus, the power consumption of the electropneumatic control system 2 is very low. Due to the upstream insertion of the pressure reducing valve 35 in series, the compressed air is fed during the release operations both into the control chamber 2 and into the main air pipe chamber 25 from a compressed air source of constant pressure head, whereby the release operations always occur in the same manner, irrespective of the momentary pressure head in the main reservoir pipe 34. According to the illustrated embodiment, the electropneumatic control system 2 combined into one subassembly requires only two pipe line connections 25' and 32', and thus can be readily installed into a compressed air brake with only minimal effort. This subassembly is also quite suitable for combination with or integration into a typical brake control valve.

The described and shown arrangement of the solenoid valves and the relay valve 19 yields optimal utilization of space and design flexibility for the housing 1. As a modification of this embodiment, it is also possible to rotate the two solenoid valves by 90° around an axis of rotation extending in the plane of the drawing and perpendicularly to the axis of the relay valve 19, so that the two solenoid valves are positioned side by side in a plane perpendicular to the drawing plane. It can also be modified in such a manner that the secondary valve parts 13 and 14 are made pneumatically tight by using elastic valve seals.

It is also possible to modify the embodiment shown by designing and arranging separately the individual structural units —inlet solenoid valve 3, outlet solenoid valve 4 and relay valve 19; they must then be connected by pipe lines at a higher assembly cost. In so doing, to reduce the cost of construction while accepting a decrease in the quality of control, it may be expedient to couple a pressure reducing valve which has a small cross section and is thus inexpensive, upstream only of the compressed air supply of the shutoff valve part 9, whereas the compressed air supply of the relay valve comes directly from the main reservoir pipe. However, it is also possible to insert into this compressed air supply a second pressure reducer adjusted, for example, to a deviating pressure head.

In the illustrated embodiment, the inlet and outlet solenoid valves 22 and 23 are operated with working current; it is also possible by a simple redesign, for example, by reversing the spring loads 7, 8 and magnet loads of the armatures 5, 6, to operate one or both of these solenoid valves with quiescent current.

We claim:

1. Electropneumatic control system for the pressure in a main air pipe (37) of compressed air brakes of rail cars, with one inlet solenoid valve and one outlet solenoid valve (3 and 4) both constituted as a 3/2-way valve with a secondary valve part (13 or 14) that is connected non-parallel to a respective tight shutoff valve part (9 or 10) and acts at least as a restrictor in the closed state, said inlet and outlet solenoid valves having said tight shutoff valve parts (9 and 10) arranged in pneumatic connections from a main reservoir pipe (34) to a control chamber (26) and from said control chamber (26) to atmosphere via a brake nozzle (38'), said control chamber (26) being attached to said main air pipe (37) via a connection comprising a passage monitoring element (11, 12), whereby, when said inlet solenoid valve and said outlet solenoid valve are closed, said control chamber and a main air pipe chamber are under the same pressure, and with a relay valve (19) having a piston (20) pressurized by pressure in said control chamber (26) against pressure in said main air pipe (37), in order to actuate a two-way valve (21) comprising an inlet valve (22) and outlet valve (23), said inlet valve (22), open in said control chamber (26) only under prevalent pressure, being arranged in a connection from said main reservoir pipe (34) to said main air pipe (37); and the outlet valve (23), open in said main air pipe (37) only under prevalent pressure, being arranged in a connection from said main air pipe (37) to atmosphere, said secondary valve parts (13 and 14) being connected in series between said control chamber (26) and said main air pipe (37), so that these remain unaffected by the volumes in the main air pipe during pressure control processes in the control chamber (26).

2. Control system as claimed in claim 1, wherein said secondary valve parts (13 and 14) have a metallically sealing construction.

3. Control system as claimed in claim 1 or 2, wherein said inlet solenoid valve and said outlet solenoid valve (3 and 4), said relay valve (19) and said control chamber (26) are combined into one subassembly (1) having only two pneumatic connections (25' and 32'), including one pneumatic connection to said main air pipe and one pneumatic connection to said main reservoir pipe (37 or 34).

4. Control system as claimed in claim 3 wherein said subassembly comprises said inlet solenoid valve (3) and said outlet solenoid valve (4) extending in parallel axial directions and perpendicularly to an axial direction of said relay valve (19).

5. Control system as claimed in claim 3, comprising a pressure reducing valve (35) disposed in a connection (33) from said main reservoir pipe (34) to a corresponding attachment (32') of said subassembly (1).

6. Control system as claimed in claim 1 or 2, comprising a pressure reducing valve (35) disposed in the connection from said main reservoir pipe (34) and said inlet solenoid valve (3) to said control chamber (26).

7. Control system as claimed in claim 1 or 2, comprising a pressure reducing valve (35) disposed in the connection from said main reservoir pipe (34) and said inlet valve part (22) to said main air pipe (37).

* * * * *